United States Patent [19]

Ludwig et al.

[11] Patent Number: 4,659,341
[45] Date of Patent: Apr. 21, 1987

[54] SILICON NITRIDE ABRASIVE FRIT

[75] Inventors: David C. Ludwig, Towanda; Robert J. Dobbs, Monroeton, both of Pa.

[73] Assignee: GTE Products Corporation, Stamford, Conn.

[21] Appl. No.: 737,013

[22] Filed: May 23, 1985

[51] Int. Cl.$^4$ ............................................. B24D 3/00
[52] U.S. Cl. ........................................ 51/293; 51/307
[58] Field of Search ................................. 51/293, 307

[56] References Cited

U.S. PATENT DOCUMENTS

| | | | |
|---|---|---|---|
| 4,224,380 | 9/1980 | Bovenkerk et al. | 51/309 |
| 4,388,085 | 6/1983 | Sarin et al. | 51/309 |
| 4,406,668 | 9/1983 | Sarin et al. | 51/309 |
| 4,441,894 | 4/1984 | Sarin et al. | 51/309 |
| 4,449,989 | 5/1984 | Sarin et al. | 51/309 |
| 4,534,773 | 8/1985 | Phaal et al. | 51/293 |
| 4,578,087 | 3/1986 | Tanaka et al. | 51/309 |

*Primary Examiner*—Paul Lieberman
*Assistant Examiner*—Willie J. Thompson
*Attorney, Agent, or Firm*—Donald R. Castle; L. Rita Quatrini

[57] ABSTRACT

An abrasive frit is disclosed comprising particles of a silicon nitride based material. The particles have essentially sharp edges and a particle size within the range of from about 0.5 to about 150 microns. An abrasive frit is disclosed as described above except that the edges of the particles are essentially smooth. A method is disclosed for producing a abrasive frit of silicon nitride based material. The method involves forming a body of silicon nitride based material, firing the body at a sufficient temperature for a sufficient time to form a relatively low density body which is then crushed to form fragmented material a portion of which comprises essentially sharp edged particles in the above given size range, followed by separating the particles from the balance of the fragmented material. At this point the sharp edged particles can be either polished to produce essentially smooth edges particles or left as is. The particles are then sintered at sufficient temperature and pressure for a sufficient time to form sintered material having a density of at least about 96% of the theoretical density of the silicon nitride based material. The sintered material is then deaggregated, followed by separating that portion of the sintered material having a particle size in the above given size range, which is the abrasive frit, from the balance of the deaggregated material.

12 Claims, No Drawings

SILICON NITRIDE ABRASIVE FRIT

BACKGROUND OF THE INVENTION

This invention relates to a method for producing an abrasive frit of silicon nitride based material and to the frit thus produced.

In abrasive machining, polishing and fine grinding operations, abrasive particles having high microhardness, low thermal expansion, high temperature stability and oxidation resistance are desirable. Diamond, an abrasive material generally used in the above operations has the disadvantage of being susceptible to oxidation at relatively low temperatures causing loss of effectiveness and at times chemical reactions.

Therefore an abrasive material having the above desirable characteristics would be desirable and an advancement in the art.

SUMMARY OF THE INVENTION

In accordance with one aspect of this invention, there is provided an abrasive frit comprising particles of a silicon nitride based material. The particles have essentially sharp edges and a particles size range within the range of from about 0.5 microns to about 150 microns.

In accordance with another aspect of this invention, there is provided an abrasive frit comprising particles of a silicon nitride based material. The particles have essentially smooth edges and a particle size within the size range of from about 0.5 microns to about 150 microns.

In accordance with still another aspect of this invention, there is provided a method for producing an abrasive frit of silicon nitride based material. The method involves forming a body of the silicon nitride based material, firing the body at a sufficient temperature for a sufficient time to form a relatively low density body which is then crushed to form fragmented material, a portion of which comprises particles having essentially sharp edges in the above given size range, followed by separating the particles from the balance of the fragmented material. The particles are then sintered at a sufficient temperature and pressure for a sufficient time to form sintered material having a density of at least about 96% of the theoretical density of the silicon nitride based material. The sintered material is then deaggregated, followed by separating that portion of the deaggregated material having a particle size in the above given range, which is the abrasive frit, from the balance of the deaggregated material.

In accordance with still another aspect of this invention, there is provided a method for producing an abrasive frit. The method involves following the forming, firing, crushing, and separating steps described above to obtain essentially sharp edged particles of a silicon nitride based material having a particle size in the range given above. The essentially sharp edged particles are then polished to produce particles having essentially smooth edges which are processed according to the above sintering, deaggregating, and separating steps to obtain the abrasive frit.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

The high microhardness, low thermal expansion, and high temperature stability of silicon nitride make it a suitable candidate for use in abrasive material. Whereas diamond oxidizes at relatively low temperatures, causing loss of effectiveness and, at times, unwanted chemical reactions, silicon nitride remains relatively stable.

The starting material of this invention is a silicon nitride based material. Generally any silicon nitride based material which can be densified by sintering can be used. The preferred silicon nitride based material of this invention consists essentially of in percent by weight about 2% aluminum oxide, about 6% yttrium oxide, and the balance silicon nitride. Any silicon nitride can be used. Most typically silicon nitride supplied by the Chemical and Metallurgical Division of GTE Products Corporation under the name of SN 502 is used.

The individual components of the starting material are first blended together by any conventional method which will result in a relatively uniform admixture suitable for the subsequent pressing, forming and heating operations. A typical method is described below.

The individual components are first milled. The milling is done usually in a vibration energy mill. One such preferred mill is the "Vibro Energy" grinding mill manufactured by SWECO, Inc., a subsidiary of Emerson Electric Company. The resulting milled mixture is then passed through a 40 mesh screen. An aqueous slip is then prepared of the resulting screened material. The slip is then passed through a 100 mesh screen and spray dried to form the relatively uniform admixture of the silicon nitride based material. This silicon nitride based material is then isporessed at preferably from about 20,000 to about 50,000 psi at ambient temperature into a body or billet. The body is then fired at a sufficient temperature for a sufficient time to form a body of relatively low density, that is, from about 60% to about 85% of the theoretical density of the silicon nitride based material. The firing step is done to provide a material of sufficient strength to allow it to be worked on without breaking. Firing temperatures are generally from about 1000° C. to about 1425° C. and preferably from about 1350° C. to about 1400° C. Firing times are generally from about 0.5 hours to about 24 hours and preferably from about 0.5 hours to about 1 hour.

The resulting relatively low density body is then crushed to form fragmented material a portion of which comprises particles having a particle size range within the range of from about 0.5 microns to about 150 microns. The crushing step is done by any standard method such as by a steel roller or roll crusher.

The portion of the fragmented material having the desired size range, that is, within the above given range, is then separated from the balance of the fragmented material by any standard technique but preferably by screening through the appropriate size screen. The desired size range is determined by the application in which it is to be used.

At this point the appropriate sized particles which have essentially sharp edges can be left as is and further processed as described below to obtain the final abrasive frit to be used in applications requiring sharp edged particles such as in fine grinding. Or the particles can be first polished as for example in a gem polishing mill to form particles having essentially smooth or rounded edges before being further processed. The final abrasive frit having smooth edges are used for example in abrasive machining.

The particles whether sharp edged or smooth edged are now sintered at a sufficient temperature and pressure for a sufficient time to densify the particles to at least about 96% of the theoretical density of the silicon nitride based material. Sintering temperatures are generally from about 1500° C. to about 1950° C. with from about 1700° C. to about 1880° C. being preferred. The sintering is done preferably under nitrogen at pressures of from about 25 psi to about 300 psi with about 200 psi being especially preferred. Sintering times are generally from about 1 hour to about 6 hours with from about 3.5 hours to about 4.5 hours being preferred.

The resulting sintered material is then deaggregated to form deaggregated material a portion of which comprises the abrasive frit, the frit having a particle size within the range of from about 0.5 microns to about 150 microns, the size range being essentially the same as the size range of the material before sintering. The deaggregation step can be done by any mechanical method such as vibration or light mortaring. The abrasive frit is then separated from the balance of the deaggregated material or out of size material usually by screening through the appropriate size screen. The frit can be further classified to a desired particle size range for a particular application.

Abrasive particles produced by either hot pressing the silicon nitride based material to form the body or billet or by isopressing followed by sintering the body prior to crushing have breaks or microfractures and as a result the particles fracture in the application. By the method of this invention, in which the body is first fired to form a relatively low density body prior to crushing, followed by sintering, there results relatively strong particles which are relatively free of breaks and microfractures which are suitable for use as abrasive materials.

By the above method, an abrasive frit is produced comprising particles of a silicon nitride based material and having a particle size range within the range of from about 0.5 microns to about 150 microns. The particles can be either sharp edged or smooth edged depending upon whether or not the polishing step is carried out. The silicon nitride based material has a composition which consists essentially of in percent by weight about 2% aluminum oxide, about 6% yttrium oxide and the balance silicon nitride.

The frit can be mounted on a wheel or used as a free abrasive.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for producing an abrasive frit of silicon nitride based material, said method comprising:
   (a) forming a body of said silicon nitride based material;
   (b) firing said body at a sufficient temperature and for a sufficient time to form a relatively low density body;
   (c) crushing said low density body to form fragmented material, a portion of which comprises particles having a size range within the range of from about 0.5 microns to about 150 microns, said particles having essentially sharp edges;
   (d) separating said particles from the balance of said fragmented material;
   (e) sintering said particles at a sufficient temperature and pressure for a sufficient time to form sintered material having a density of at least about 96% of the theoretical density of said silicon nitride based material;
   (f) deaggregating said sintered material to form deaggregated material a portion of which comprises the abrasive frit, said frit having a particle size range within the range of from about 0.5 microns to about 150 microns; and
   (g) separating said abrasive frit from the balance of said deaggregated material.

2. A method of claim 1 wherein said silicon nitride based material consists essentially of in percent by weight about 2% aluminum oxide, about 6% yttrium oxide, and the balance silicon nitride.

3. A method of claim 1 wherein said body is fired at a temperature of from about 1000° C. to about 1425° C. for from about 0.5 hours to about 24 hours.

4. A method of claim 1 wherein said particles are sintered at a temperature of from about 1500° C. to about 1950° C., a pressure of from about 25 psi to about 300 psi for from about 1 hour to about 6 hours.

5. A method for producing an abrasive frit of silicon nitride based material, said method comprising:
   (a) forming a body of said silicon nitride based material;
   (b) firing said body at a sufficient temperature and for a sufficient time to form a relatively low density body;
   (c) crushing said low density body to form fragmented material, a portion of which comprises particles having a size range within the range of from about 0.5 microns to about 150 microns, said particles having essentially sharp edges;
   (d) separating said particles from the balance of said fragmented material;
   (e) polishing said particles to form particles having essentially smooth edges;
   (f) sintering the smooth edged particles at a sufficient temperature and pressure for a sufficient time to form sintered material having a density of at least about 96% of the theoretical density of said silicon nitride based material;
   (g) deaggregating said sintered material to form deaggregated material a portion of which comprises the abrasive frit having a size range within the range of from about 0.5 microns to about 150 microns; and
   (h) separating said abrasive frit from the balance of said deaggregated material.

6. A method of claim 5 wherein said silicon nitride based material consists essentially of in percent by weight about 2% aluminum oxide, about 6% yttrium oxide, and the balance silicon nitride.

7. A method of claim 5 wherein said body is fired at a temperature of from about 1000° C. to about 1425° C. for from about 0.5 hours to about 24 hours.

8. A method of claim 5 wherein said particles are sintered at a temperature of from about 1500° C. to about 1950° C., a pressure of from about 25 psi to about 300 psi for from about 1 hour to about 6 hours.

9. A composition consisting essentially of an abrasive frit material of particles of a silicon nitride based material, said particles having essentially sharp edges and a particle size range within the range of from about 0.5 microns to about 150 microns and said particles having a density of at least about 96% of the theoretical density for said silicon nitride based material, said frit material being suitable for fine grinding.

10. A composition consisting essentially of an abrasive frit material of particles of a silicon nitride based material, said particles having essentially smooth edges and a particle size range within the range of from about 0.5 microns to about 150 micron and said particles having a density of at least 96% of the theoretical density of said silicon nitride based material, said frit material suitable for abrasive machining.

11. A composition according to claim 10 wherein said silicon nitride based material consists essentially of, in percent by weight, about 2% aluminum oxide, about 6% yttrium oxide, balance silicon nitride.

12. An abrasive frit of claim 9 wherein said silicon nitride based material consists essentially of in percent by weight about 2% aluminum oxide, about 6% yttrium oxide, and the balance silicon nitride.

* * * * *